United States Patent [19]

Junior et al.

[11] Patent Number: 4,492,779
[45] Date of Patent: Jan. 8, 1985

[54] ARAMID POLYMER AND POWDER FILLER REINFORCED ELASTOMERIC COMPOSITION FOR USE AS A ROCKET MOTOR INSULATION

[75] Inventors: Kenneth E. Junior, Madison; James D. Byrd, Huntsville, both of Ala.

[73] Assignee: Thiokol Corporation, Chicago, Ill.

[21] Appl. No.: 328,333

[22] Filed: Dec. 7, 1981

[51] Int. Cl.$^3$ .......................... C08K 3/40; C08K 3/36; C08K 3/22
[52] U.S. Cl. ..................................... 523/138; 523/179; 524/413; 524/431; 524/445; 524/447; 524/514; 428/423.1
[58] Field of Search ............... 523/138, 153, 155, 156; 524/514, 431, 413, 445, 447; 525/178, 935

[56] References Cited

U.S. PATENT DOCUMENTS

| | | | |
|---|---|---|---|
| 3,347,047 | 10/1967 | Hartz et al. | 60/253 |
| 3,421,970 | 1/1969 | Daly et al. | 161/170 |
| 3,746,669 | 7/1973 | Dunnom et al. | 260/3 |
| 3,853,796 | 12/1974 | Oldack et al. | 525/935 |
| 3,888,805 | 6/1975 | Van Gils et al. | 525/935 |
| 3,954,701 | 5/1976 | Schaffling | 525/178 |
| 3,956,561 | 5/1976 | Anderson et al. | 428/288 |
| 3,969,568 | 7/1976 | Sperley | 525/178 |
| 4,021,209 | 5/1977 | Binkley | 51/298 A |
| 4,041,010 | 8/1977 | Jeram | 524/445 |
| 4,130,537 | 12/1978 | Bohrer | 260/38 |
| 4,219,452 | 8/1980 | Littlefield | 260/3 |
| 4,227,438 | 10/1980 | Precoul | 89/1.816 |
| 4,244,944 | 1/1981 | Trainor et al. | 428/37 |
| 4,255,817 | 3/1981 | Heim | 2/2 |
| 4,320,823 | 3/1982 | Covaleski | 523/156 |
| 4,381,639 | 5/1983 | Kress | 57/229 |

FOREIGN PATENT DOCUMENTS 0020273 12/1980 European Pat. Off. ............ 524/514

OTHER PUBLICATIONS

Shalders; The Development of Elastomeric Formulations to Withstand Extremely High Temperature and Pressures; *Journal of the Institution of the Rubber Industry*; vol. 3, No. 1; 1969.
Du Pont, "Characteristics and Uses of Kevlar ® 49 Aramid High Modulus Organic Fiber," (Feb., 1978).
Du Pont, "Du Pont Develops Pulp Form of Kevlar for Asbestos Replacement Applications," (Feb. 23, 1981).
"Fibrous Reinforcements: Alive with Product Improvement Technology," *Modern Plastics* 44–46 (Jul., 1981).

*Primary Examiner*—Lewis T. Jacobs
*Attorney, Agent, or Firm*—Gerald K. White

[57] ABSTRACT

An elastomeric composition suitable for use as a rocket motor case insulation is disclosed. The composition consists of a vulcanizable elastomeric composition and reinforcing aramid polymer fibers in combination with a powder filler. A preferred embodiment utilizes polyisoprene as the elastomer, KELVAR ® fibers as the aramid polymer fibers, and silica as the powder filler.

19 Claims, 1 Drawing Figure

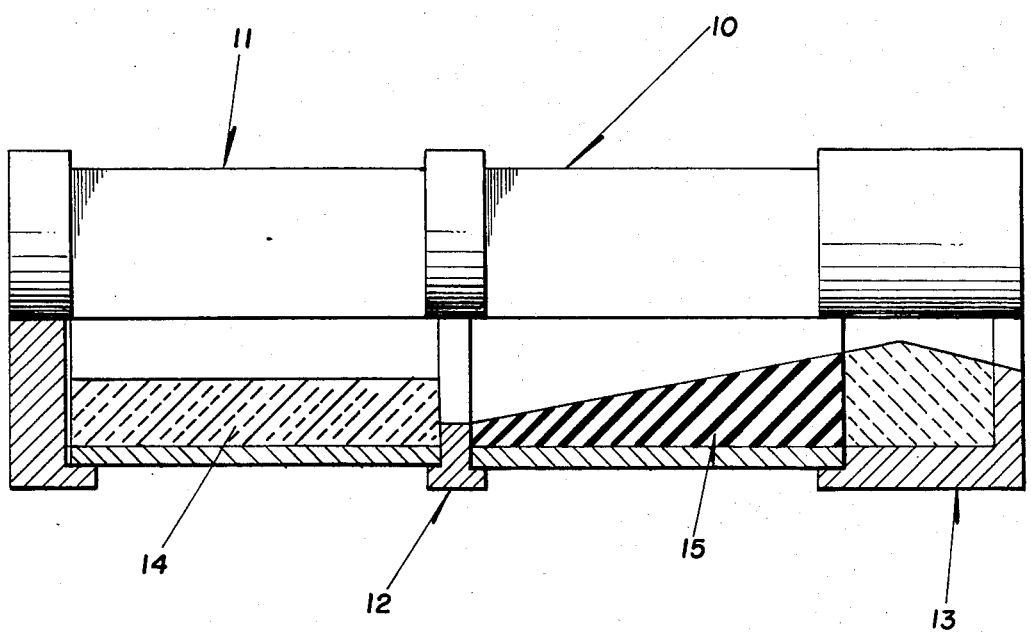

ARAMID POLYMER AND POWDER FILLER REINFORCED ELASTOMERIC COMPOSITION FOR USE AS A ROCKET MOTOR INSULATION

The U.S. Government has a nonexclusive, nontransferable, royalty-free license to make, use, or sell the invention pursuant to Contract No. F04611-78-C-0073, awarded by the Department of the Air Force to Thiokol Corporation.

BACKGROUND OF THE INVENTION:

The invention relates to the incorporation of silica powder and aramid polymer fibers into an elastomeric insulation for rocket motor casings.

The combustion of solid rocket propellant creates a hostile environment characterized by extremely high temperature, pressure, and turbulence in the interior of the rocket motor. Temperatures typically exceed 5,000° F. Interior pressure may typically exceed 1,500 psi. Chamber gas velocity typically may reach Mach 0.2 at the aft end of the rocket motor. This environment is considered particularly hostile because the combustion gas typically contains dispersed particles consisting essentially of aluminum oxide liquid droplets. These suspended droplets are believed to produce erosion of the rocket motor case insulation by a sandblasting effect. While the combustion of rocket propellant is usually of short duration, the conditions described above can destroy unprotected rocket motor casings.

Attempts have been made to protect those parts of the rocket structure which may be exposed to the high temperature and erosive flow conditions of the burning propellant. These attempts have principally been directed to methods of protecting the rocket structure by applying some sort of a protective coating or lining to the surfaces which are exposed to the burning propellant and hot turbulent gases. Various plastics and rubbers, both filled and unfilled, have been tried. These include phenolic resins, epoxy resins, high temperature melamine-formaldehyde coatings, ceramics, polyester resins and the like. These plastics are for the most part cured to a rigid structure. Because of the rigid structure of these plastics, cracking and/or blistering is encountered when they are exposed to the rapid temperature and pressure changes encountered during the burning of the propellant. Some rubber-like elastomeric systems have been used. The use of these elastomeric systems is of an ablative nature, that is, the elastomer is sacrificed or consumed in a manner such that the rocket chamber is protected from the high temperature generated during the burning of the fuel.

A more successful method of protecting the structural members of the rocket from these hostile conditions is to provide a lining or coating containing asbestos. This type coating is adapted to withstand flame temperatures and the high velocity flow conditions resulting from the combustion of liquid or solid propellants. Such coatings or linings are capable of enduring for a time sufficient to allow complete combustion of the propellant. Asbestos-reinforced elastomeric insulation systems are the subject of Daly et al, "Elastomeric Composition Containing Chromic Oxide For Use As Rocket Insulation", U.S. Pat. No. 3,421,970 (Jan. 14, 1969), and Hartz et al, "Elastomeric Composition For Use As Rocket Insulation", U.S. Pat. No. 3,347,047 (Oct. 17, 1967).

Environmental and health concerns have led manufacturers to seek a replacement for asbestos-containing rocket motor case insulation which exhibits an acceptably low erosion rate. We attempted to replace asbestos with silica powder, but found that silica reinforced polyisoprene exhibited an unacceptably high erosion rate.

SUMMARY OF THE INVENTION

In its most general form, the invention consists of the discovery that a combination of powder filler and aramid polymer fibers may be substituted for asbestos in elastomeric compositions suitable for use as rocket motor case insulation. In addition to eliminating the health and environmental concerns associated with asbestos-containing rocket motor case insulation, the invention provides an elastomeric insulation which exhibits similar thermal conductivity and lower specific gravity than asbestos-containing insulation. The invention also exhibits a very low coefficient of thermal expansion.

DESCRIPTION OF THE DRAWING

The FIGURE is a longitudinal elevation of an Insulation Test Motor, partially sectioned, illustrating a method for testing the invention.

DETAILED DESCRIPTION OF THE INVENTION

It has been discovered that aramid polymer fibers in combination with a powder filler may be successfully substituted for asbestos in elastomeric rocket motor case insulation without loss of the high erosion resistance which characterizes asbestos-reinforced rocket motor case insulation. Erosion resistance increases with increasing aramid polymer fiber content up to a maximum of approximately 22 percent by weight. (Throughout the specification and claims, the phrase "percent by weight" means percent by weight of total composition.) Processing and cure considerations limit the allowable aramid polymer fiber content. Too much aramid polymer fiber will result in a very dry, non-homogeneous insulation with the appearance of dry cardboard. Aramid polymer fibers may typically be included in the elastomeric composition in an amount ranging from 1 to 40 percent by weight. A powder filler is used as a secondary reinforcing agent, and also improves the physical properties of the fiber filled elastomer. In this way high erosion resistance is provided without substantially sacrificing the mechanical properties of the elastomer. Suitable powder fillers include silica, iron oxide, titanium oxide, milled glass, carbon and ceramic clays. Silica powder is preferred, and may be typically included in amounts ranging from 1 to 75 percent by weight. Optimum aramid polymer fiber and powder filler content for a particular elastomeric system will depend on the cure and mechanical characteristics of the particular elastomer selected. Our preferred isoprene composition consists of 25.4 percent by weight of aramid polymer fiber and approximately 20.8 percent by weight of silica powder.

Aramid polymers suitable for use in practice of the invention are commercially available from E. I. DuPont de Nemours Company, Wilmington, Delaware under the trademarks KEVLAR®, KEVLAR®29, KEVLAR®49, and NOMEX®. The term "aramid polymer" as used in the present specification means synthetic polymeric resin generally designated in the art as an aromatic polycarbonamide. "Aramid polymer" is disclosed in Technical Disclosure T950,008 (95 OG 6, published Sept. 7, 1976, and based on an application originally filed Feb. 18, 1975) as being a polymer described in U.S. Pat. Nos. 3,652,510; 3,699,085; and 3,673,143 and is believed to be of a composition hereinafter described. In these patents, the polymers disclosed therein include fiber forming polymers of high molecular weight, e.g. having an inherent viscosity of at least about 0.7, characterized by recurring units of the formula $$\left[-\underset{|}{\overset{H}{N}}-Ar_1-\underset{|}{\overset{H}{N}}-\overset{O}{\underset{\|}{C}}-Ar_2-\overset{O}{\underset{\|}{C}}-\right]$$

wherein $Ar_1$ is p-phenylene and/or chloro-substituted p-phenylene and/or 4,4-substituted diphenyl methane, i.e.,

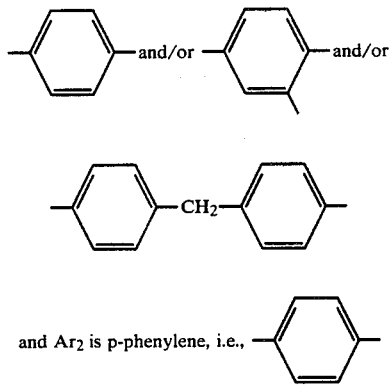

and $Ar_2$ is p-phenylene, i.e.,

Illustrative examples of polycarbonamides coming within the definition of the above formula are poly (p-phenylene terephthalamide), chloro-substituted poly (p-phenylene terephthalamide), and copolymers thereof.

The designation of the position of location of the substituent groups on the aromatic nuclei of the aramid polymer refers to the location of the substituents on the aromatic diamine, diacid or other coreactants from which the aramid polymer is prepared.

Although the aramid polymer or aromatic polycarbonamide may consist primarily of carbonamide links (—CONH—) and aromatic ring nuclei, conforming to the formula above, the polymer may contain up to 20 mole percent and preferably 0 to 5 mole percent of non-conforming comonomer units which provide units in the polycarbonamide chain different from $$-\underset{|}{\overset{H}{N}}-Ar_1-\underset{|}{\overset{H}{N}}- \text{ and } -\overset{O}{\underset{\|}{C}}-Ar_2-\overset{O}{\underset{\|}{C}}-$$

such as aromatic carbonamide units whose chain extending bonds are coaxial or parallel and oppositely directed, e.g.

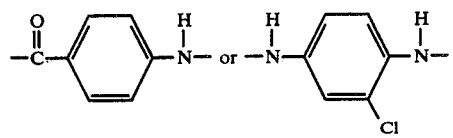

meta-phenylene units, non-aromatic and non-amide groups.

A more comprehensive disclosure of the composition of aramid polymers is found in U.S. Pat. No. 3,673,143 as well as the divisional patent thereof, U.S. Pat. No. 3,817,941, the teachings of which are herein incorporated by reference.

Independent analytical tests and infra-red analysis have indicated that KEVLAR ®29 could be predominately (95% weight) poly (p-phenylene diamine terephthalamide and could be chemically described as poly (p-phenylene diamine terephthalamide)-co-poly (4,4-diamino diphenyl methane terephthalamide).

KEVLAR ® aramid polymer fibers are available as ¼ inch (6.35 mm) long fibers (KEVLAR ®29) and as 2 to 4 mm long, highly fibrillated fibers. By "fibrillated," it is meant that many fine fibrils or sub-fibers are attached to the core fibers. The pulp form of KEVLAR ® is further discussed in a brochure entitled "DuPont Develops Pulp Form of "Kevlar" For Asbestos Replacement Applications."

During our research KEVLAR ®29 aramid polymer fibers of ¼ inch length were primarily used, although some compositions were prepared using KEVLAR ® aramid polymer pulp. The insulation prepared with KEVLAR ®29 aramid polymer fibers exhibited slightly better mechanical properties than the insulations formulated with aramid polymer pulp. However, either form of aramid polymer may be used in the invnetion.

By the term "powder filler" it is meant any powder filler with a particle size range, expressed as specific surface, area of from about 1 meter$^2$/gram to about 200 meter$^2$/gram. Suitable powder fillers include silica, iron oxide, titanium oxide, milled glass, carbon and ceramic clay fillers. Silica powder is preferred because of its low cost and because of its relatively low absorption of the pre-cured elastomeric liquid, which thereby minimizes drying of the composition during mixing.

Silica powder is commercially available as HI-SIL-®EP from PPG Industries, Inc., Chemical Division, 1 Gateway Center, Pittsburgh, Pa. 15222. A large particle size, about 40 millimicrons, is preferred since the greater surface area of smaller particle size silica causes excessive drying of the composition during mixing.

By the term "elastomer" it is meant any rubber-like substance having some degree of flexibility in the cured, vulcanized, or heat and pressure-converted state. Examples of suitable elastomers are butyl rubber, butadiene-styrene copolymer rubbers, nitrile rubbers, neoprene rubbers, polyurethane rubbers, polybutadiene rubbers, polyisoprene rubbers, silicone rubbers, chlorosulfonated polyethylene rubbers, polyacrylonitrile rubbers, polysulfide rubbers, as well as various combinations and blends of these rubbers.

DESCRIPTION OF A PREFERRED EMBODIMENT

A preferred composition using polyisoprene as the elastomer is set out below:

|  | Percent By Weight |
|---|---|
| Elastomeric System | |
| Polyisoprene | 55.2 |
| Zinc oxide | 2.8 |
| Polyethylene glycol | 1.7 |
| Sulfur | 1.4 |
| Stearic acid | 1.1 |
| N—tert-butyl-2-benzothiazole-sulfenamide | 0.8 |
| Mixed mono-, di-, and tristyrenated phenolic compounds | 0.5 |
| Tetramethylthiuram monosulfide | 0.4 |
| Diphenylamine reacted with acetone | 0.3 |
| Reinforcing Agents | |
| Silica powder | 24.8 |
| Aramid polymer fibers | 11.0 |
| Total | 100.0 |

Zinc oxide is used as a cross-linking agent in combination with elemental sulfur. Stearic acid is used as a catalyst release agent. Polyethylene glycol, tetramethyl thiuram monosulfide, and N-tert-butyl-2-benzothiazolesulfenamide are used as cure accelerators.

Mixed mono-, di-, and tristyrenated phenols are used as antioxidants and are commercially available as AGERITE® Spar from the B. F. Goodrich Chemical Company, 6100 Oak Tree Boulevard, Cleveland, Ohio 44131.

Diphenylamine reacted with acetone is used as an antioxidant and is commercially available as BLE®25 Liquid from Uniroyal, Inc., Uniroyal Chemical Division, Naugatuck, Conn. 06770.

It is emphasized that the compounds listed and described above are illustrative only and are not critical to the invention. The elastomeric system chosen may utilize any effective curing system and may omit or include conventional additives such an antioxidants and plasticizers.

HOW TO MAKE

The silica and aramid fiber reinforced elastomeric composition just described can be prepared by the following procedure:

1. 100 parts of polyisoprene is added to a pre-warmed (135° F.) Banbury mixer set at slow speed with cold water on full. The mixing clock is set.

2. After three minutes of slow continuous mixing add 2.0 parts of stearic acid, 1.0 parts of AGERITE®Spar mixed mono-, di-, and tristyrenated phenols, 5.0 parts of zinc oxide, 0.5 parts of BLE®25 Liquid diphenylamine reacted with acetone, 3.0 parts of polyethylene glycol, and 0.7 parts tetramethylthiuram monosulfide. The mix temperature should be approximately 135° F.

3. At the five minute mark, add 45.0 parts of HI-SIL-®EP silica powder and about 6.5 parts of KEVLAR® aramid polymer fibers. The mix temperature should be approximately 145° F.

4. After three more minutes of slow, continuous mixing, add another 6.5 parts of KEVLAR® aramid polymer fibers. The mix temperature should be approximately 200° F.

5. After another four minutes of slow mixing add the remaining 7.0 parts of KEVLAR® aramid polymer fibers. The mix temperature should be approximately 240° F.

6. Stop mixing at the fifteen minute mark and discharge the mixture into a container.

7. Refine the mix to approximately 0.010 inch thickness by passing through a very tight roll mill five times. Allow to cool.

8. The Banbury mixer is set for slow mixing and the clock is set. One half of the master mix is added, then 2.5 parts of sulfur and 1.5 parts of n-tert-butyl-2-benzothiazolesulfenamide is added. Finally, the remaining one half of the master mix is added.

9. When the mix temperature reaches 180° F. (after approximately seven minutes of slow mixing), discharge the silica and aramid polymer fiber reinforced composition into a container.

During the mixing process the aramid polymer fibers are broken down from their original length to an average length of approximately 3 mm. This value is an average fiber length; actual fiber length after mixing ranges from 0.02 mm to 4.00 mm. Excessive mixing will lead to further fiber shortening. While we do not know of a critical fiber length, we believe that the longer the average fiber length, the more erosion resistant the insulation will be.

HOW TO USE

The novel insulation is applied to a rocket motor interior in the same manner as asbestos-reinforced elastomeric insulation. The uncured insulation is hand-washed with methylene chloride and allowed to dry. It is then "layed-up" into the rocket motor case that has been primed with a bond promotor. The insulation is compressed into place with a pressurized bag and cured by heating to 170° F. and maintaining said temperature and pressure for approximately 16 hours.

WORKING EXAMPLES

The following examples are illustrative only and are not intended to limit the scope of the invention in any way. All quantities are measured by percent weight unless otherwise stated.

EXAMPLE 1

Three sample insulation mixes were prepared with the composition listed in Table I below. The elastomeric binder systems differ in the reinforcing agents used: TI-R300 represents the prior art asbestos-containing rocket motor insulation. TI-R700 contains silica powder only, and TI-R701 contains both aramid fibers and silica powder.

TABLE I

| Compound | Sample Insulation Mix | | |
|---|---|---|---|
|  | TI-R300 | TI-R700 | TI-R701 |
| Polyisoprene* | 100 | 100 | 100 |
| Zinc oxide | 5 | 5 | 5 |
| Stearic acid | 2 | 2 | 2 |
| Sulfur | 2.5 | 2.5 | 2.5 |
| AGERITE ® Spar | 1 | 1 | 1 |
| BLE ® 25 liquid | 0.5 | 0.5 | 0.5 |
| N—tert-butyl-2-benzothiazole-sulfenamide | 0 | 1.5 | 1.5 |
| Polyethylene glycol | — | 3.0 | 3.0 |
| Tetramethylthiuram monosulfide | — | 0.7 | 0.7 |
| Silica powder (22 millimicrons particle size) | 5 | — | — |
| Asbestos | 100 | — | — |
| Silica powder (40 millimicrons particle size) | — | 65 | 45 |
| Aramid polymer (KEVLAR ®) | — | — | 20 |

After curing, the sample mixes were subjected to conventional physical testing. The results of these tests are listed in Table II.

TABLE II

|  | TI-R300 | TI-R700 | TI-R701 |
|---|---|---|---|
| Specific gravity | 1.37 | 1.18 | 1.15 |
| Hardness (Shore A) | 79 | 66 | 78 |
| Tensile with grain, psi | 1,289 | 2,616 | 1,112 |
| Tensile across grain, psi | 974 | 2,311 | 934 |
| Strain W/G, psi | 48 | 733 | 45 |
| Strain A/G, psi | 515 | 719 | 329 |
| Thermal conductivity (Cal/Cm Sec° C.) | $4.212 \times 10^{-4}$ | $5.13 \times 10^{-4}$ | $5.61 \times 10^{-4}$ |

The three sample mixes were also subjected to a torch erosion test to evaluate their erosion characteristics. In a torch erosion test the cured insulation is pressed into a 0.10 inch thick sheet. An oxyacetylene torch is positioned 1.0 inch from and perpendicular to the insulation sheet. The time "T" from torch ignition to burn through of the insulation is recorded by stopwatch to give an approximate erosion rate for the insulation according to the formula $$\frac{\text{Inches Eroded}}{\text{Time in Seconds}} = \text{Erosion Rate}.$$

The erosion rates for the three sample insulations are listed in Table III.

TABLE III

| TI-R300 | 0.006 inch/second |
|---|---|
| TI-R700 | 0.009 inch/second |
| TI-R701 | 0.007 inch/second |

EXAMPLE 2

Nine sample insulation mixes (A through I) were prepared, all using the elastomeric composition described in Table IV:

TABLE IV

| Compound | Parts By Weight |
|---|---|
| Polyisoprene | 100 |
| Zinc oxide | 5.0 |
| Mixed mono-, di-, and tristyrenated phenols | 1.0 |
| Diphenylamine reacted with acetone | 0.5 |
| Stearic acid | 2.0 |
| N—tert-butyl-2-benzothiazole-sulfenamide | 1.5 |
| Sulfur | 2.5 |
| Polyethylene glycol | 3.0 |
| Tetramethylthiuram monosulfide | 0.7 |
| Total | 116.2 |

Aramid polymer fibers and silica powder was added to these sample insulation mixes in varying proportion as shown in Table V:

TABLE V

| Compound | Sample Insulation Mix (Percent By Weight) | | | | | | | | |
|---|---|---|---|---|---|---|---|---|---|
|  | A | B | C | D | E | F | G | H | I |
| Silica Powder | 21.8 | 21.3 | 20.8 | 6.0 | 11.4 | 16.1 | 3.1 | 11.4 | 24.8 |
| Aramid Polymer Fibers | 21.8 | 23.7 | 25.4 | 24.1 | 22.7 | 21.5 | 24.8 | 22.7 | 11.0 (Pulp) |

These nine sample formulations were tested for physical properties such as tensile strength, hardness, and specific gravity. Test results are listed in Table VI:

TABLE VI

|  | Sample Insulation Mix | | | | | | | | |
|---|---|---|---|---|---|---|---|---|---|
|  | A | B | C | D | E | F | G | H | I |
| Tensile stress W/G, psi | 1187 | 934 | 1042 | 1090 | 1690 | 1717 | 847 | 1080 | 1902 |
| Tensile stress A/G, psi | 1362 | 1361 | 1185 | 1567 | 1602 | 1409 | 1111 | 1273 | 1700 |
| Hardness (Shore A) | 76 | 80 | 83 | 77 | 79 | 78 | 80 | 77 | 72 |
| Specific gravity | 1.07 | 1.07 | 1.07 | 1.02 | 1.03 | 1.04 | 1.03 | 1.04 | 1.05 |

These nine sample insulation mixes were also evaluated for erosion characteristics by static testing. Referring to the FIGURE, the Insulation Test Motor is composed of four sections: an insulated test section 10 joined on one end to rocket motor 11 by insulated coupler 12, and joined on the opposite end to nozzle 13. The interior of the rocket motor contains center-perforated rocket propellant 14, which is ignited by conventional means not shown. Insulated test section 10 contains rocket motor case insulation 15 which is to be tested. The thickness of the rocket motor case insulation is uniformly increased from an initial 0.5 inch thickness at the edge of the insulated test section joined to the insulated coupler 12 to a maximum of 2.5 inches at the opposite end of the insulated test section, thereby describing a truncated cone of rocket motor case insulation. The nozzle 13 extends the truncated cone to a minimum inside diameter of 1.0 inch before the slope of the nozzle reverses.

The burning time of the rocket propellant during static testing is typically about 5 seconds. Average interior pressure is typically 850 psi. The velocity of the rocket exhaust varies with the thickness of the rocket motor case insulation from approximately 0.015 Mach at the 0.5 inch thickness to approximately 0.200 Mach at the 2.5 inch thickness.

The static test described above accurately simulates the intended environment of the rocket motor case insulation-heat, pressure, turbulence and suspended aluminum oxide droplets. Erosion rates of the nine sample insulation mixes, measured in inches of insulation eroded per second of rocket motor operation, are listed in Table VII:

TABLE VII

| Mach No. | Sample Insulation Mix | | | | | | | | |
|---|---|---|---|---|---|---|---|---|---|
|  | A | B | C | D | E | F | G | H | I |
| 0.05 | 0.011 | 0.015 | 0.010 | 0.026 | 0.018 | 0.017 | 0.017 | 0.015 | 0.019 |
| 0.10 | 0.038 | 0.030 | 0.027 | 0.050 | 0.024 | 0.031 | 0.016 | 0.040 | 0.034 |

TABLE VII-continued

| Mach No. | Sample Insulation Mix | | | | | | | | |
|---|---|---|---|---|---|---|---|---|---|
| | A | B | C | D | E | F | G | H | I |
| 0.15 | 0.051 | 0.050 | 0.036 | 0.086 | 0.045 | 0.058 | 0.051 | 0.070 | 0.063 |
| 0.20 | 0.054 | 0.060 | 0.042 | 0.108 | 0.068 | 0.070 | 0.054 | 0.092 | 0.075 |

What is claimed is:

1. A process for insulating a solid propellant rocket motor, comprising the step of employing an essentially asbestos-free elastomeric composition as an insulating liner, said composition comprising:
   A. from 1 to 40 percent by weight of aramid polymer fibers,
   B. from 1 to 75 percent by weight of a powder filler selected from the group consisting of silica, iron oxide, titanium oxide, carbon, milled glass, and ceramic clays, and
   C. A vulcanizable elastomeric composition including:
      (i) a vulcanizable elastomer, and
      (ii) vulcanizing agents for said elastomer.

2. The process of claim 1 wherein the aramid polymer fiber content ranges from 17 to 28 percent by weight.

3. The process of claim 1 wherein said vulcanizable elastomer is polyisoprene.

4. The process of claim 1 wherein said powder filler is composed of particles having an average particle size of at least 30 millimicrons.

5. The process of claim 1 wherein said vulcanizable elastomer is polyacrylonitrile rubber.

6. The process of claim 1 wherein said vulcanizable elastomer is butyl rubber.

7. The process of claim 1 wherein said vulcanizable elastomer is a butadiene-styrene copolymer.

8. The process of claim 1 wherein said vulcanizable elastomer is nitrile rubber.

9. The process of claim 1 wherein said vulcanizable elastomer is polybutadiene.

10. The process of claim 1 wherein said vulcanizable elastomer is silicone rubber.

11. The process of claim 1 wherein said vulcanizable elastomer is chlorosulfonated polyethylene.

12. The process of claim 1 wherein said vulcanizable elastomer is a fluorocarbon polymer.

13. The process of claim 1 wherein said vulcanizable elastomer is an ethylene-propylene diene monomer.

14. The process of claim 1 wherein said vulcanizable elastomer is a polysulfide.

15. The process of claim 1 wherein said vulcanizable elastomer is neoprene.

16. The process of claim 1 wherein said vulcanizable elastomer is a polyurethane.

17. The process of claim 1, wherein said powder filler is silica.

18. A process for insulating a solid propellant rocket motor, comprising the step of employing an essentially asbestos-free elastomeric composition as an insulating liner, said composition consisting essentially of:
   A. from 1 to 40 percent by weight of aramid polymer fibers;
   B. from 1 to 75 percent by weight of powder filler selected from the group consisting of silica, iron oxide, titanium oxide, carbon, milled glass, and ceramic clays; and
   C. A vulcanizable elastomeric composition including
      (i) a vulcanizable elastomer, and
      (ii) vulcanizing agents for said elastomer.

19. The process of claim 18, wherein said powder filler is silica.

* * * * *